United States Patent
Willmann et al.

Patent Number: 5,853,229
Date of Patent: Dec. 29, 1998

[54] METHOD AND APPARATUS FOR CONTROLLING THE BRAKE SYSTEM OF MOTOR VEHICLES WITH ELECTRIC DRIVE

[75] Inventors: Karl-Heinz Willmann, Freiberg; Juergen Breitenbacher, Winterbach; Andreas Kellner, Moeglingen; Ludwig Dreilich, Eberdingen-Hochdorf, all of Germany

[73] Assignee: Robert Bosch GmbH, Stuttgart, Germany

[21] Appl. No.: 762,194

[22] Filed: Dec. 9, 1996

[30] Foreign Application Priority Data

Feb. 6, 1996 [DE] Germany .................. 196 04 134.1

[51] Int. Cl.$^6$ .................................................. B60T 13/74
[52] U.S. Cl. ........................... 303/3; 303/152; 318/371
[58] Field of Search ............................ 303/3, 20, 152, 303/151, 113.1, 15, 119.1, 115.2, 116.1, 116.2; 318/371; 701/78

[56] References Cited

U.S. PATENT DOCUMENTS

| | | | |
|---|---|---|---|
| 5,294,191 | 3/1994 | Giorgetti et al. | 303/152 X |
| 5,378,053 | 1/1995 | Patient et al. | 303/3 |
| 5,421,643 | 6/1995 | Kircher et al. | 303/3 |
| 5,433,512 | 7/1995 | Aoki et al. | 303/3 |
| 5,472,264 | 12/1995 | Klein et al. | 303/3 |
| 5,511,859 | 4/1996 | Kade et al. | 303/3 |
| 5,549,371 | 8/1996 | Konaga et al. | 303/152 |

FOREIGN PATENT DOCUMENTS 0527065  10/1993  European Pat. Off. .

Primary Examiner—Lee W. Young
Attorney, Agent, or Firm—Fulbright & Jaworski, LLP.

[57] ABSTRACT

In a first region of the driver's braking command, regenerative braking produces almost all of the braking torque, whereas the friction brake produces essentially no braking torque. In this region of the braking command, the pressure medium flowing into the wheel brake cylinder as a result of the driver's actuation of the brake pedal, is conducted by appropriate control back to a storage chamber. The first region is limited by a threshold brake pedal travel which corresponds to the maximum braking torque available from the motor. When pedal travel exceeds this threshold, the friction brake and the motor both effect braking.

15 Claims, 5 Drawing Sheets

METHOD AND APPARATUS FOR CONTROLLING THE BRAKE SYSTEM OF MOTOR VEHICLES WITH ELECTRIC DRIVE

BACKGROUND OF THE INVENTION

The invention pertains to a method and to an apparatus for controlling the brake system of vehicles with electric drive.

A method and an apparatus of this type are known from U.S. Pat. No. 5,472,264, which is incorporated herein by reference. This document describes a brake system for a vehicle with electric drive, which system includes a conventional brake system equipped with hydraulically actuated friction brakes and an electroregenerative brake system. The electroregenerative brake system uses the electric drive motor or motors of the motor vehicle for braking and for recovering energy during the braking process. The portion of the braking force contributed by the hydraulic friction brake is adjusted during the braking process in correspondence with the behavior of the regenerative brake to optimize the amount of energy recovered. For this purpose, the braking force to be produced at the drive wheels is determined from the degree of actuation of the brake pedal, whereas the nondriven wheels are braked in the conventional manner by the hydraulic system as a direct function of the pedal actuation. With respect to the drive wheels, operating variables are used to determine the maximum usable braking force available from the regenerative brake under the current braking conditions, and the specified braking force is produced by the appropriate control of the drive motor. If the required braking force exceeds the maximum usable braking force, the extra braking force is produced by the friction brake.

In the case of the drive wheels, measures are taken to decouple the hydraulic system from the actuation of the pedal, whereas conventional, direct hydraulic control is allowed to act on the nondriven wheels. The known solution thus represents a complicated redesign of the brake system and its components.

SUMMARY OF THE INVENTION

It is the object of the invention to provide measures for controlling the brake system of a vehicle provided with electric drive in which, with the use of a conventional hydraulic or pneumatic friction brake, optimum coordination is achieved between the regenerative braking via the electric motor and the friction brake, so that as much energy as possible can be recovered.

This is achieved by utilizing the braking torque of the drive motor to effect regenerative braking in a first braking command region having an upper limit defined by a threshold pedal travel, the friction brake having substantially no effect on this region. When the pedal travel exceeds this threshold, which preferably corresponds to the maximum braking torque contributed by the motor, the friction brake contributes braking torque in correspondence with the additional pedal travel.

As a result of the invention, optimum advantage can be taken of the potential for regenerative braking in electric vehicles or in vehicles with hybrid drives with the use of conventional, unmodified brake systems with friction brakes.

The electric drive motor or motors recover the maximum possible amount of energy during braking. Braking demands in excess of the regenerative braking are covered by a conventional friction brake.

After the electrical system of the vehicle has been turned off, the friction brake acts on all wheels of the vehicle. This guarantees the operational reliability of the vehicle.

When a conventional brake system which includes components for a drive slip control function is used, the pedal force remains small.

Additional advantages of the invention can be derived from the description of exemplary embodiments.

DESCRIPTION OF EXEMPLARY EMBODIMENTS

Figure 1:
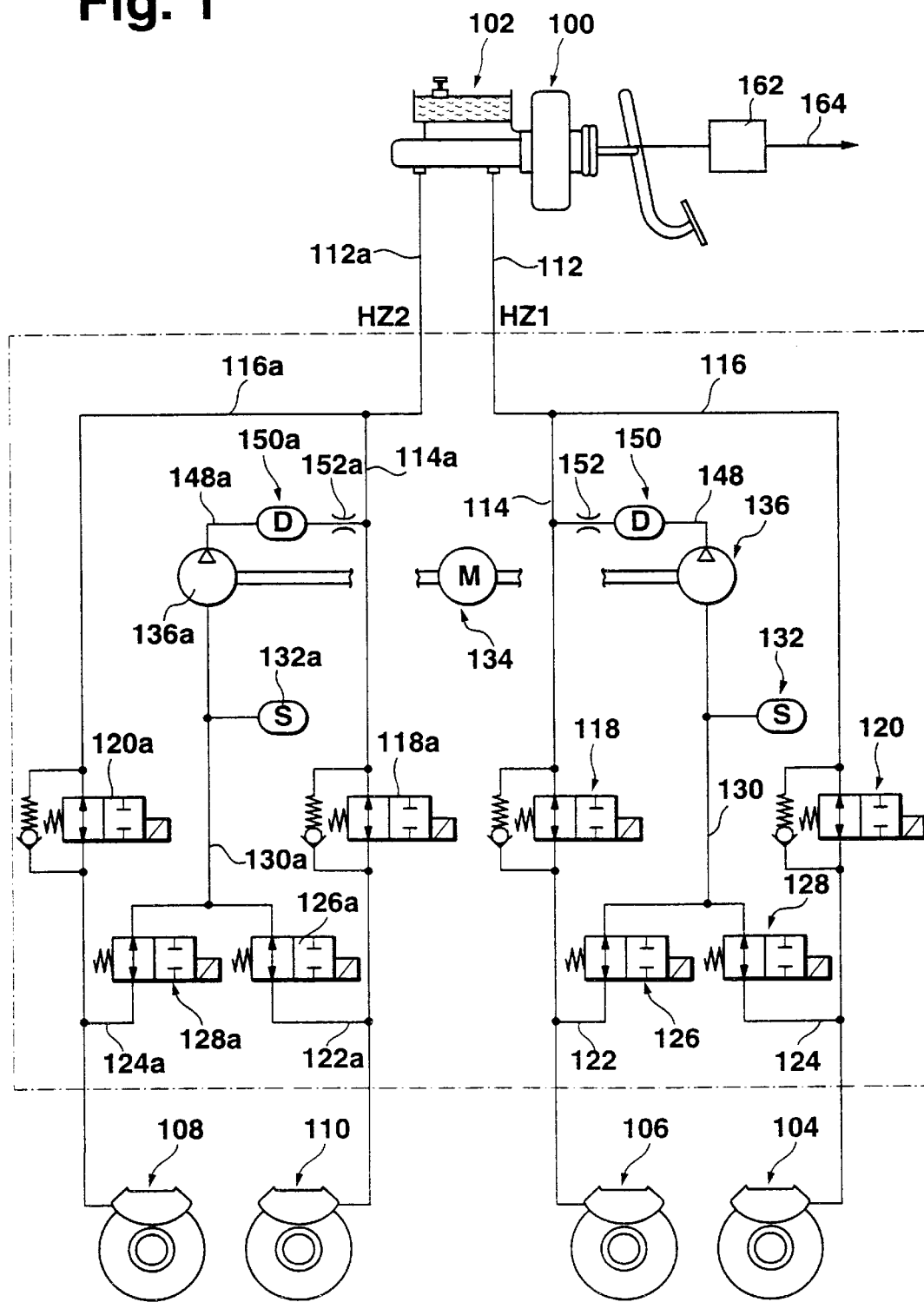
FIG. 1 is a schematic diagram of a convention hydraulic system with ABS functions.

FIG. 1 shows a conventional hydraulic brake system with ABS function. Each of the two brake circuits (HZ1, HZ2) includes two wheel brakes of the two-axle vehicle. The brake system has a pedal-actuated, twin-circuit master brake cylinder 100 with a reservoir 102 for the pressure medium. At least one measuring device 162 for implementing regenerative braking is provided on brake pedal 101; this device transmits a value representing the degree to which the brake pedal is actuated or the force of such actuation by the driver via its output line 164.

The first brake circuit (HZ1) is connected to wheel brakes 104, 106, which can be, for example, the brakes of the nondriven wheels. Wheel brakes 108, 110, such as the brakes of the driven wheels of the vehicle, are connected to a second brake circuit (HZ2). Because the two brake circuits in the example of a conventional brake system illustrated in FIG. 1 are designed in essentially the same way, only the first brake circuit (HZ1) is described in the following. The second brake circuit has a corresponding set of components, which are designated by the addition of an "a" to the reference number. A brake line 112 proceeding from the master brake cylinder divides into two branch brake lines 114, 116, leading to wheel brakes 106, 104. Inlet valves 118, 120, which have a spring-actuated open position and an electromagnetically switchable closed position, are provided in brake lines 114, 116. Between the inlet valves and the wheel brakes, a return line 122, 124 proceeds from each of these brake lines. Each of these return lines has an outlet valve 126, 128. The outlet valves have a spring-actuated closed position and an electromagnetically switchable open position. Return lines 122, 124 join to form a single return line 130, to which a storage chamber 132 is connected. In addition, the brake circuit also has a high pressure-generating pump 136, driven by an electric drive motor 134. This pump is connected on the intake side to return line 130. On the delivery side, pump 136 is connected by way of a transport line 148 to brake line 114 between the master brake cylinder and inlet valve 118. A damping chamber 150 and a throttle valve 152 are installed in transport line 148.

Under normal operating conditions, the valves are in their unactuated, base position. This means that inlet valves 118, 120 are open, while outlet valves 126, 128 are closed. As a result, the pressure produced by the driver by actuating the pedal acts on the corresponding wheel brakes. In the ABS case, the outlet valves are opened and the pump turned on to release pressure from the wheel brake or brakes in question.

Figure 2:
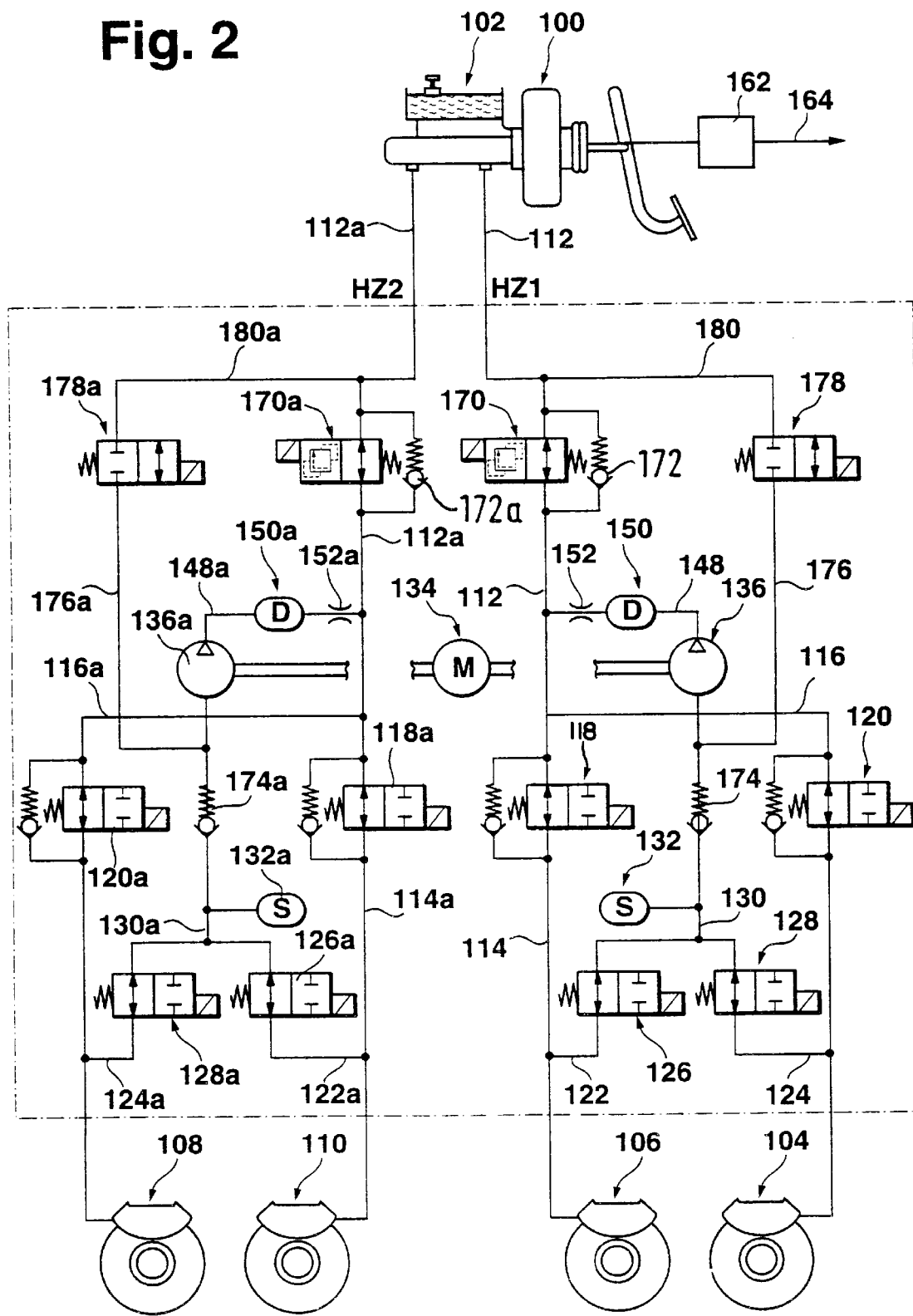
FIG. 2 is a schematic diagram of a conventional hydraulic brake system with ABS and ASR functions.

FIG. 2 shows a hydraulic brake system which has additional components to provide an ASR function in addition to the ABS function.

In the brake system according to FIG. 2, a so-called switching valve 170, which is bridged by a pressure-limiting valve 172, is inserted in brake line 112. The switching valve has a spring-actuated open position and an electromagnetically switchable closed position. In addition, a nonreturn valve 174 is installed in the line between storage chamber 132 and pump 136. This valve prevents negative pressure from developing in the wheel brake cylinders when the outlet valve is open. In addition to return line 130, an intake line 176 is also connected to the intake side of pump 136; an intake control valve 178 with a spring-actuated closed position and an electromagnetically switchable open position is inserted in this intake line. The intake valve is connected to brake line 112 by a line 180.

If the drive wheels of the vehicle are showing too much slip, the corresponding switching valve 172 is switched to its closed position, and the intake valve 178 is switched to its open position. Through actuation of the pump 136, pressure medium is drawn without actuation of the pedal from reservoir 102 and conveyed through the open inlet valve 118, 120 into the wheel brake cylinder or cylinders 106, 104 in question. As a result, pressure can be built up in the wheel brakes independently of any actuation of the brake pedal. The pressure is released by opening the outlet valves 126, 124 as shown in the example according to FIG. 1 or by closing the intake valves 178 and opening the switching valves 172.

In addition to the hydraulically actuated friction brakes illustrated in FIGS. 1 and 2, regenerative braking by way of the electric motor or motors used to drive the vehicle is also possible as a component of the electric or hybrid vehicle. The electric motor is driven as a generator to charge the batteries. A separate control unit is usually provided to control the electric drive. This separate unit is connected to the control unit which controls the hydraulic brake system.

Figure 3:
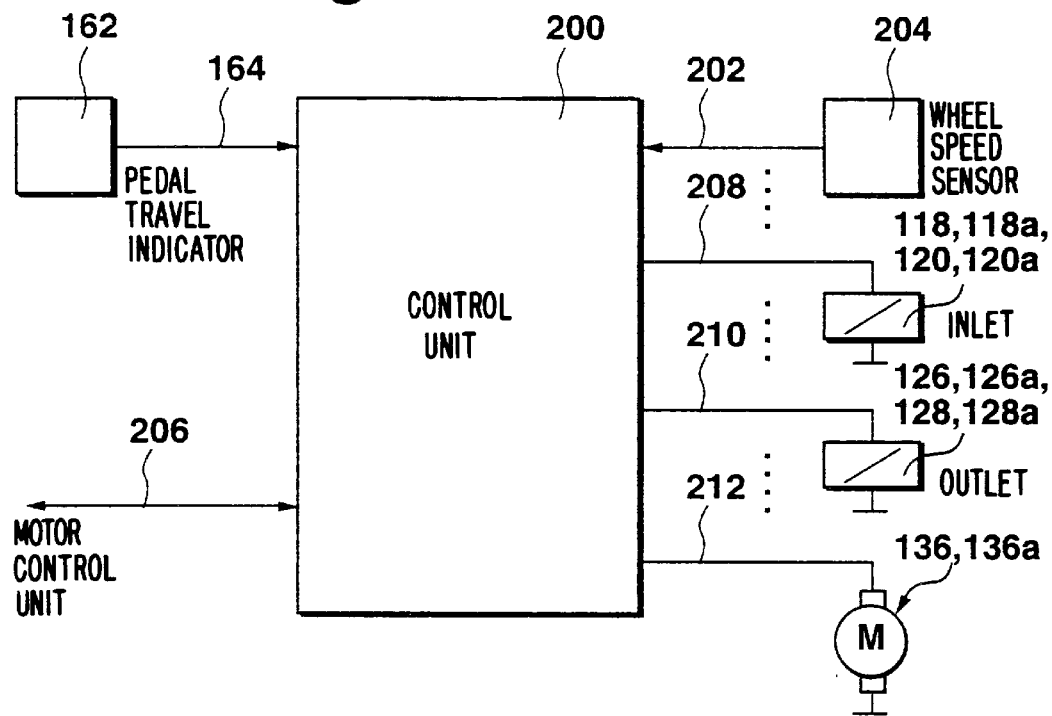
FIG. 3 shows an electronic control unit with input and output signals for controlling the brake system of an electric-drive vehicle.

An example of a control unit such as this is shown in FIG. 3. Control unit 200 receives a value representing the actuation of the brake pedal from unit 162 over an input line 164 and values representing the rotational speeds of the vehicle's wheels from measuring devices 204 over a line 202. In addition, a connecting line 206, preferably a serial bus, to the motor control unit is provided, over which control unit 200 receives a value representing the braking torque produced by the regenerative brake and transmits a value representing the braking torque to be produced. In addition, output lines 208, 210, 212 for controlling inlet valves 118, 120, outlet valves 126, 128, and pump 136 are also present.

The goal of the invention is to recover the maximum possible amount of energy which is created during braking in an electric or hybrid vehicle. Because the regenerative braking provided by the drive motor of the vehicle is not sufficient to cover all the braking requirements of the vehicle, the vehicle must also be equipped with a friction brake. Regenerative braking and the friction brake should be designed to work together in such a way that as much energy as possible can be recovered.

The braking operations including the friction brake and the regenerative brake are coordinated in at least one computer element, which includes control unit 200. For this purpose, at least one signal representing the actuation of the pedal is sent to the control unit. If the electrical system is in operation, the electric motor or motors can do the braking. At the beginning of the braking operation, upon actuation of the brake pedal, the valves in the hydraulic brake system are therefore actuated in such a way that little or no pressure is built up in the wheel brake cylinders, i.e., not enough to cause significant braking action, if any. This is carried out preferably by the opening of the outlet valves 126, 128, the pressure medium fed to the wheel brakes by the driver's actuation of the pedal flowing back to storage chamber 132. The driver's braking command is derived as a function of the actuation of the brake pedal and possibly of other operating variables as well. This command, as known in accordance with the state of the art, is converted to a nominal motor torque, which is transmitted over a bus to the motor control unit. The motor control unit then brings about the desired braking deceleration. If the driver wishes to continue to brake after the storage chamber has become full, brake pressure is built up in the wheels by the friction brake in accordance with the driver's command in addition to the regenerative braking, and thus a superimposed braking action is achieved.

To shorten the distance the pedal must travel, it is possible in an advantageous exemplary embodiment for the outlet valves to close when the storage chamber is only partly full. In this way, the pedal does not have to travel as far before the friction brake is allowed to act.

As a result of the solution according to the invention, the pedal retains its familiar characteristics. In particular, the behavior of the pedal is not "hard" in the range of regenerative braking even though the brake pressure is low, corresponding to the counterpressure in the storage chamber.

This basic method must be corrected in a few operating situations.

The electric drive usually acts on only one axle; therefore, regenerative braking also acts on only this axle. This means that the braking force distribution between the front and rear axles is not uniform; on the contrary, the distribution fluctuates, depending on the extent of the regenerative braking. For most braking processes, this behavior is not troublesome. During braking processes in dangerous or boundary-line situations, however, it is advantageous for the braking force distribution to be uniform or preselectable in certain ways. Therefore, the control unit does not open the outlet valves at the beginning of braking when such situations have been identified. The friction brake thus starts to brake immediately, so that the specified braking force distribution is ensured. Such braking situations include, for example, so-called panic braking, the occurrence of which can be derived, for example, from the speed at which the brake pedal is actuated.

There are also other operating situations in which the amount of regenerative braking must be reduced. This is the case, for example, when the battery is full; when the charging capacity is too high over time; or when, as a result of a change in vehicle velocity, the dependence of the motor braking torque on the vehicle velocity affects the overall deceleration. In these operating situations, the overall braking effect will decrease if the driver does not move the pedal. Because the control unit of the electric drive feeds the instantaneous motor torque back to the brake control unit, the outlet valves, if they are still open, are closed and the pump is started. As a result, the liquid volume which has collected in the storage chamber is returned to the brake circuit. Thus, without the pedal being moved any farther, the contribution by the friction bake can be increased.

To prevent the force which the driver's foot must exert on the pedal from increasing as a result, it is provided in a brake system according to FIG. 2 that, in operating situations in which the participation of the friction brake is increased, the switching valve 172 is also actuated in addition to the pump 136, so that the braking pressure in the wheel can be increased without the counter-force at the pedal increasing.

If none of these special operating situations is present, in the preferred exemplary embodiment the outlet valves 126, 128 are closed in accordance with a relationship, stored in the control unit, between the degree to which the storage chamber is filled and the distance the pedal has traveled. The outlet valves are closed as soon as the distance which the pedal has traveled exceeds a value which corresponds to a certain degree of filling of the storage chamber. The reason for this is that the storage chamber may not be allowed to fill completely during regenerative braking, so as to preserve the ability of the antilock system of the friction brake to function properly.

Another advantageous method consists in allowing the storage chamber to fill completely during regenerative braking. If, after the storage chamber has become full, the antilock system of the friction brake goes into action, the pressure can only be released slowly because of the filled storage chamber. According to the invention, therefore, the drive motor or motors are switched briefly to drive mode by the control unit to compensate for the excessive braking torque of the wheels.

The latter solution makes it more important to select a spring of the proper strength. When the outlet valves are open, the resistance to the pedal is determined by the spring in the storage chamber. Until now, this spring has been made as weak as possible so that, if the wheels lock, the brake pressure can be reduced to a low level. When, during the regenerative braking phase, the storage chamber spring represents the only resistance to the pedal, it may be necessary in some exemplary embodiments for the spring to be somewhat stronger. This means, however, that, in the antilock case, the brake pressure cannot be released to a low level. In this case, too, the electric motors of the electric vehicle can be switched to drive to compensate for the excessive braking torque of the friction brake. As an alternative, the hardness of the return springs on the pedal or in the master brake cylinder can be increased, so as to increase the counterforce at the pedal during the regenerative braking phase.

If, for thermal reasons, the selected outlet valves cannot be actuated long enough to handle the actual case just described, it is advantageous for the two outlet valves of the one brake circuit to be actuated in alternation.

Figure 4:
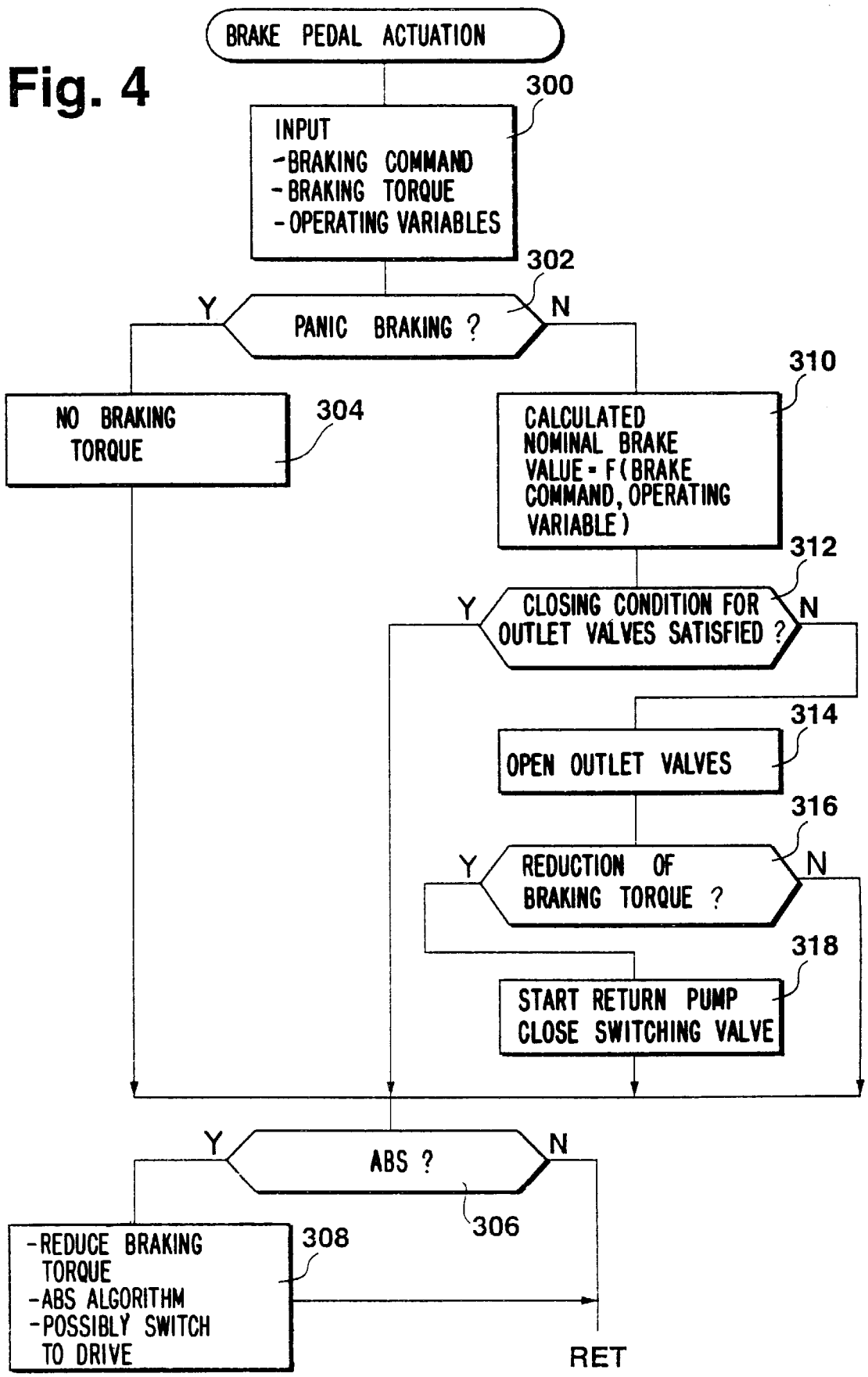
FIG. 4 is a flow chart which illustrates the method according to the invention as a computer program.

FIG. 4 illustrates the invention on the basis of a flow diagram. The corresponding computer program is started when the driver actuates the brake pedal. In the first step 300, the operating variables which are evaluated according to the invention are sent as input to the control unit. These are the braking command, the actual braking torque of the electric motor, and other operating variables such as the velocity of the vehicle, the level of charge in the battery, etc. Then, in step 302, the program checks to see whether a so-called panic braking situation is present. Panic braking is present when, for example, the speed at which the brake pedal is actuated exceeds a predetermined limit value. In this case, step 304 specifies that the electric motor should not generate any braking torque; the friction brake is used in the conventional manner. In the next step 306, the program checks to see whether or not at least one wheel is starting to lock. If so, then the ABS case is present, for which the control unit releases the pressure in the wheel starting to lock in step 308 according to known ABS algorithms. Depending on the embodiment, the electric motor is switched briefly to drive to decrease excess braking torque. After step 308, the subprogram will return to step 300 at the given time as long as the brake pedal continues to be actuated. If panic braking was not detected in step 302, then in step 310 the nominal braking torque for regenerative braking is determined on the basis of the input values for the braking command and possibly other operating variables such as the level of charge in the battery, the velocity of the vehicle, etc. In the next step 312, the program checks to see whether or not the closing conditions for the outlet valves are satisfied. In the preferred exemplary embodiment, this means that the program checks to see whether the distance the pedal has traveled exceeds a predetermined distance corresponding to the maximum degree of filling of the storage chamber. If so, the outlet valves are not or are no longer actuated, and the process continues with step 306. If the closing condition is not satisfied, the outlet valves are opened in step 314 in a certain cycle. Then the program checks in step 316 to see whether or not, during the braking process, the braking torque of the regenerative braking has been reduced. If so, then in step 318 the pump is started and possibly the switching valve closed. After step 318, the program continues with step 306 in the same way as after a "no" answer to step 316.

Figure 5:
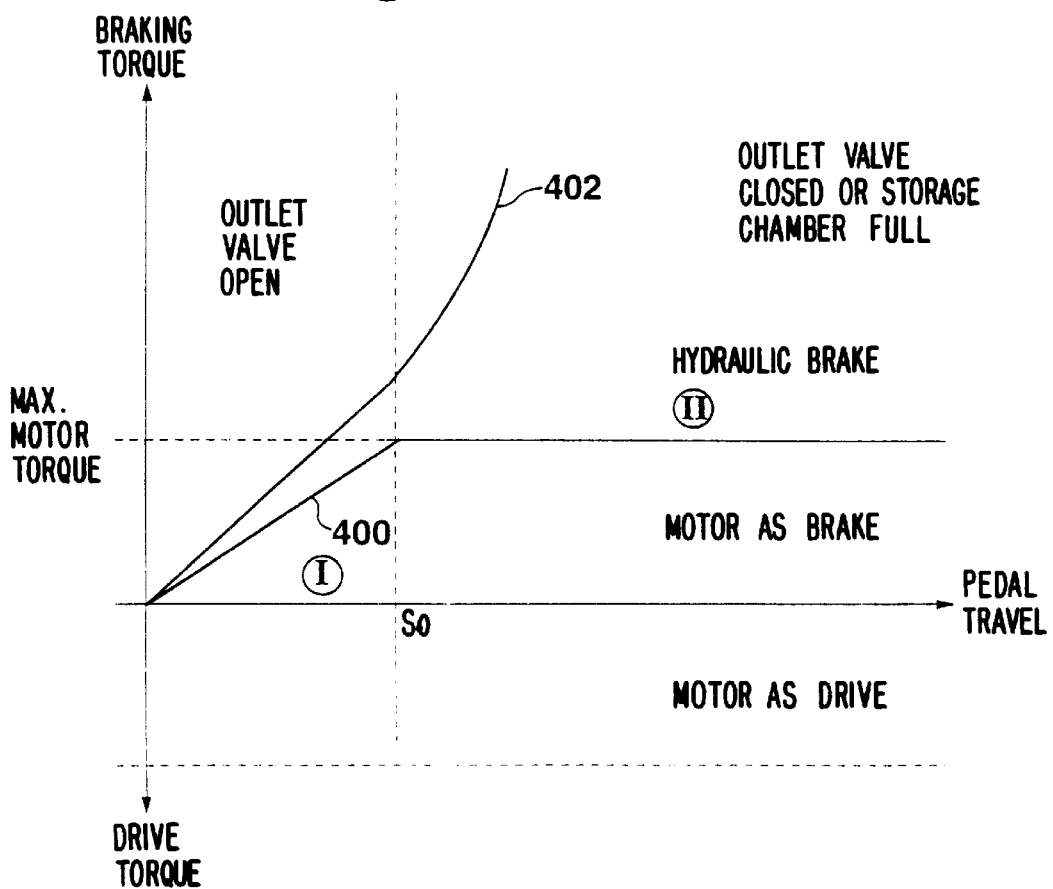
FIG. 5 is a plot of braking torques versus pedal travel.

FIG. 5 shows a plot of the braking torque of the motor and the hydraulic brake versus the distance traveled by the pedal. In a first region I, in which the outlet valves of the hydraulic brake are opened, the braking torque is provided chiefly by the motor acting as brake (curve 400). At a pedal travel of $S_0$, the maximum motor torque is reached. The hydraulic brake system is now designed in such a way that, at pedal travel $S_0$, the storage chamber is full or has reached its maximum degree of filling, at which point the outlet valves are closed. From then on, in region II, the braking torque is generated chiefly by the hydraulic friction brake. Curve 402 represents the additive curve of the braking torque contributed by the motor acting as brake and that contributed by the hydraulically actuated friction brake.

Figure 6A:
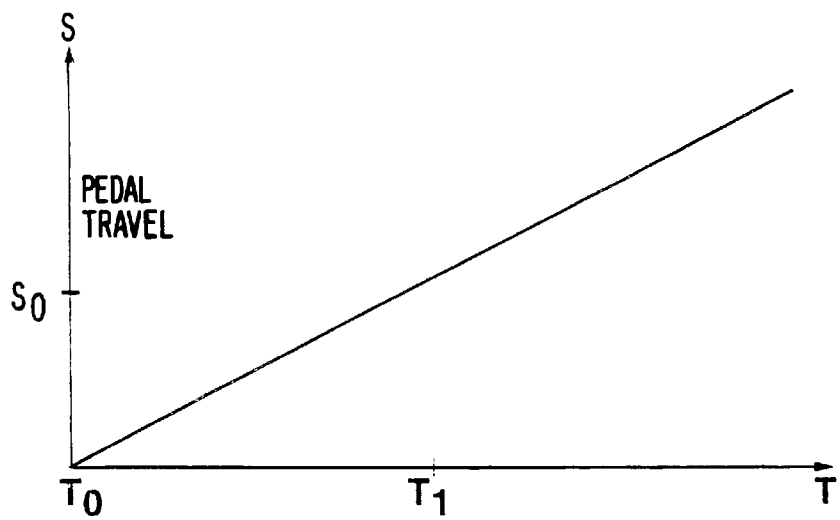
FIG. 6a–6b are plots illustrating braking torques versus time.
Figure 6B:
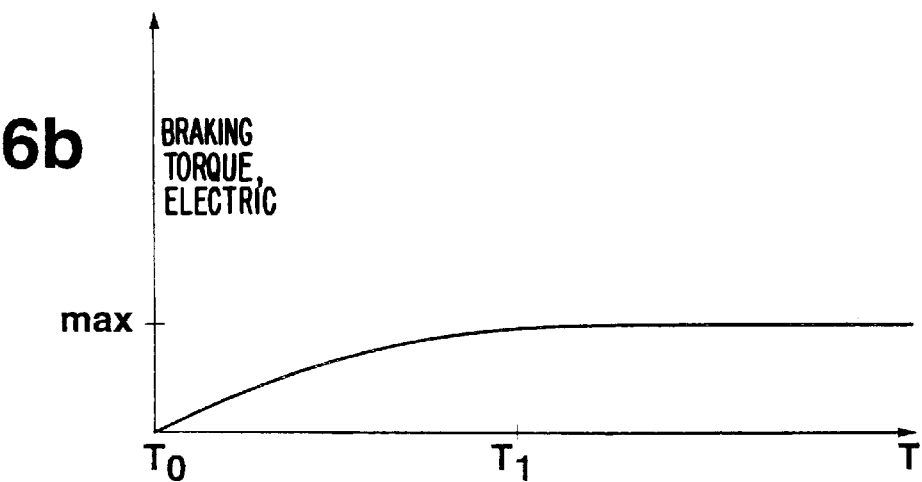
Figure 6C:
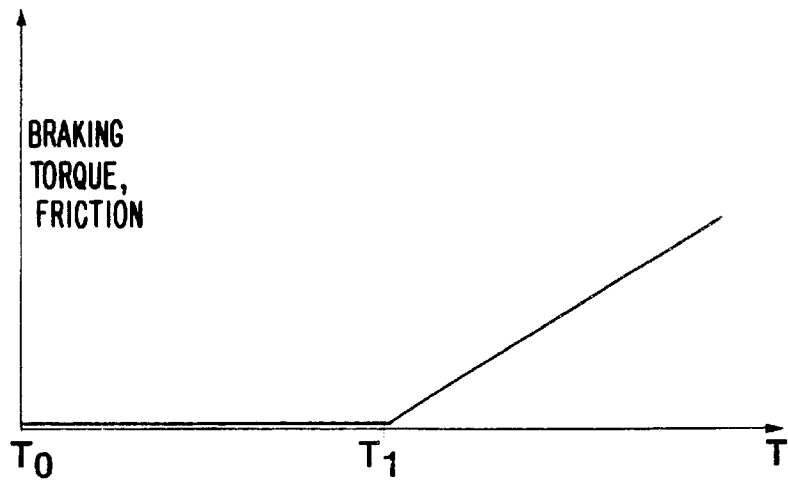

The way in which the solution according to the invention works is also illustrated in FIG. 6 on the basis of time plots for a typical braking situation. FIG. 6a shows the distance traveled by the pedal, FIG. 6b the braking torque produced by the electric motor, and FIG. 6c the braking torque generated by the friction brake. At time $T_0$, the driver steps on the pedal to a degree that remains under limit value $S_0$. Therefore, the braking torque is produced almost exclusively by the electric drive. The braking torque contributed by the friction brake is negligible. At time $T_1$, the driver actuates the brake pedal to a degree which exceeds the value $S_0$. Because the electric braking torque has reached its maximum value at time $T_1$, starting from time $T_1$, braking torque is now produced by the friction brake as a function of the distance traveled by the pedal.

The solution according to the invention is suitable not only for the hydraulic brake systems illustrated in FIGS. 1 and 2 but also for any brake system in which the pressure generated in the brake line by the driver's actuation of the brake pedal can be diverted into a storage element without leading to any significant actuation of the brakes.

The solution according to the invention therefore acts not only on the drive wheels but also on all the other wheels of the brake system.

We claim:

1. Method for controlling a brake system of a vehicle having wheels including drive wheels driven by an electric drive motor, said brake system comprising a brake pedal which undergoes pedal travel in response to a driver's braking command, means for effecting regenerative braking by said electric drive motor, and a hydraulic friction brake system comprising wheel cylinder means at each wheel, components for implementing at least one ABS function, a control device for determining degree of demand of the driver for braking, and valve arrangements for controlling the hydraulic friction brake system, said method comprising:
   effecting brake torque by regenerative braking by said motor when the demand of the driver for braking is in a first range of demand for braking and
   controlling said friction brake system when the demand of the driver for braking is in the first range of demand for braking, so that pressure created by the pedal travel caused by depression of the brake pedal by the driver produces substantially no braking effect compared with the brake torque produced by the regenerative braking at said drive wheels, said valve arrangements being controlled so that hydraulic pressure medium which flows into the wheel cylinder means as a result of depression of the brake pedal flows out of the cylinders.

2. Method as in claim 1 wherein said friction brake is effective when said pedal travel exceeds a threshold.

3. Method as in claim 2 wherein said threshold pedal travel corresponds to a maximum braking torque available from said motor.

4. Method for controlling the brake system of a vehicle having wheels including drive wheels driven by an electric drive motor, said brake system comprising a brake pedal which undergoes pedal travel in response to a driver's braking command, means for effecting regenerative braking by said electric drive motor, and a friction brake comprising wheel cylinder means at each wheel, said friction brake increasing pressure in said wheel cylinder means in response to said pedal travel, said method comprising effecting regenerative braking by said motor in a first braking command region having an upper limit defined by a threshold pedal travel, said friction brake having substantially no braking effect at said drive wheels in said first braking command region;
   said brake system comprising outlet valve means for the brake cylinder means at each wheel, said method further comprising opening said outlet valve means at the wheel cylinders of said drive wheels in said first braking command region.

5. Method for controlling the brake system of a vehicle having wheels including drive wheels driven by an electric drive motor, said brake system comprising a brake pedal which undergoes pedal travel in response to a driver's braking command, means for effecting regenerative braking by said electric drive motor, and a friction brake comprising wheel cylinder means at each wheel, said friction brake increasing pressure in said wheel cylinder means in response to said pedal travel, said method comprising effecting regenerative braking by said motor in a first braking command region having an upper limit defined by a threshold pedal travel, said friction brake having substantially no braking effect at said drive wheels in said first braking command region; said brake system comprising a fluid pressure medium which, in said first driver's command region, flows from said wheel cylinder means to a storage chamber until said chamber is full.

6. Brake system for a vehicle having wheels including drive wheels driven by an electric drive motor, said brake system comprising:
   a brake pedal which undergoes pedal travel in response to a driver's braking command,
   regenerative braking means for effecting braking by said electric drive motor at at least one of the drive wheels,
   a hydraulic friction brake system comprising wheel cylinder means at each wheel, components for implementing at least one ABS function, and valve arrangements for controlling the hydraulic friction brake system, said friction brake system causing hydraulic pressure medium to flow into said wheel cylinder means in response to said pedal travel, and
   an electronic control unit controlling the hydraulic friction brake system so that, responsive to a determination that demand of the driver for braking action is within a first range of brake demand, substantially all braking is provided by regenerative braking and so that pressure created in the friction braking system by the pedal travel caused by depression of the brake pedal by the driver produces substantially no braking effect compared with the brake torque produced by the regenerative braking at said drive wheels, said electronic control unit controlling the valve arrangements so that hydraulic pressure medium which flows into the wheel cylinder means as a result of depression of the brake pedal flows out of the cylinders.

7. Brake system as in claim 6 further comprising means for building up pressure in said wheel cylinder means at said drive wheels when said pedal travel exceeds a threshold.

8. Brake system as in claim 7 wherein said threshold pedal travel corresponds to a maximum braking torque available from said motor.

9. Brake system as in claim 6 further comprising
   means for detecting a dangerous braking situation, and
   means for overriding said regenerative braking means so that braking is effected exclusively by said friction brake when a dangerous situation is detected.

10. Brake system as in claim 6 further comprising means for reducing braking torque produced by said drive motor and compensating for said reduction with braking torque produced by said friction brake.

11. Brake system as in claim 10 further comprising
    means for reducing braking torque produced by said drive motor,
    a switching valve between said brake pedal and said friction brake,
    pump means for pumping pressure medium into said wheel cylinders, and
    means for closing said switching valve and activating said pump means after reducing braking torque produced by said drive motor.

12. Brake system as in claim 6 further comprising
    means for detecting ABS operation, and
    means for overriding said regenerative braking means and switching said motor to drive said wheels when ABS operation is detected.

13. Brake system for a vehicle having wheels including drive wheels driven by an electric drive motor, said brake system comprising
    a brake pedal which undergoes pedal travel in response to a driver's braking command,
    regenerative braking means for effecting braking by said electric drive motor in a first braking command region having an upper limit defined by a threshold pedal travel,
    a friction brake comprising wheel cylinder means at each wheel, said friction brake increasing pressure on said wheel cylinder means in response to said pedal travel, and means for preventing pressure increase in said wheel cylinder means at said drive wheels in said first braking command region;

said means for preventing pressure increase in said wheel cylinder means at said drive wheels comprising outlet valve means at said wheel cylinders.

14. Brake system for a vehicle having wheels including drive wheels driven by an electric drive motor, said brake system comprising a brake pedal which undergoes pedal travel in response to a driver's braking command, regenerative braking means for effecting braking by said electric drive motor in a first braking command region having an upper limit defined by a threshold pedal travel, a friction brake comprising wheel cylinder means at each wheel, said friction brake increasing pressure on said wheel cylinder means in response to said pedal travel, and means for preventing pressure increase in said wheel cylinder means at said drive wheels in said first braking command region, and a fluid pressure medium for increasing pressure in said wheel cylinder means and a storage chamber, said means for preventing pressure increase in said wheel cylinder means comprising means for causing said fluid pressure medium to flow from said wheel cylinder means to said storage chamber in said first braking command region.

15. Brake system for a vehicle having wheels including drive wheels driven by an electric drive motor, said brake system comprising:

regenerative braking means for effecting braking of at least one of said drive wheels by said electric drive motor, a hydraulic friction brake system including components for implementing at least one ABS function, a brake control unit which controls the hydraulic friction brake system, a motor control unit which controls the electric drive motor of the vehicle, the motor control unit having means for effecting regenerative braking of the drive wheels by said electric motor, a bus system connecting the electric motor and the brake control unit, the motor control unit transmitting a signal representing the actual regenerative braking torque produced by the motor over the bus system, and the brake control unit receiving a signal representing the actual braking torque produced by the motor and formed by the motor control unit over the bus system and a signal representing degree of actuation of the brake pedal, said brake control unit forming a signal representing desired braking torque based on the signal representing degree of actuation of the brake pedal, and transmitting said signal representing the desired regenerative braking torque to the motor control unit over said bus system.

* * * * *